US012206188B2

(12) United States Patent
Itami et al.

(10) Patent No.: US 12,206,188 B2
(45) Date of Patent: Jan. 21, 2025

(54) CIRCUIT INTEGRATED ANTENNA

(71) Applicant: Nippon Telegraph and Telephone Corporation, Tokyo (JP)

(72) Inventors: Go Itami, Tokyo (JP); Hiroshi Hamada, Tokyo (JP); Hideyuki Nosaka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 283 days.

(21) Appl. No.: 17/770,570

(22) PCT Filed: Oct. 31, 2019

(86) PCT No.: PCT/JP2019/042877
§ 371 (c)(1),
(2) Date: Apr. 20, 2022

(87) PCT Pub. No.: WO2021/084705
PCT Pub. Date: May 6, 2021

(65) Prior Publication Data

US 2022/0393357 A1 Dec. 8, 2022

(51) Int. Cl.
*H01Q 9/04* (2006.01)
*H01Q 1/22* (2006.01)

(52) U.S. Cl.
CPC ......... *H01Q 9/0464* (2013.01); *H01Q 1/2283* (2013.01)

(58) Field of Classification Search
CPC ............... H01Q 1/2283; H01Q 9/0464; H01Q 21/0093; H01Q 5/364; H01Q 9/0457
See application file for complete search history.

(56) References Cited

U.S. PATENT DOCUMENTS 4,197,544 A 4/1980 Kaloi
5,376,942 A 12/1994 Shiga
11,005,980 B1 * 5/2021 Lee .......................... H01Q 1/44
(Continued)

FOREIGN PATENT DOCUMENTS

JP H0548328 A 2/1993

OTHER PUBLICATIONS

Hau, G. et al., "High Efficiency, Wide Dynamic Range Variable Gain and Power Amplifier MMICs for Wide-Band CDMA Handsets," IEEE Microwave and Wireless Components Letters, vol. 1, No. 1, Jan. 2001, 3 pages.
(Continued)

*Primary Examiner* — Thien M Le
(74) *Attorney, Agent, or Firm* — Slater Matsil, LLP

(57) ABSTRACT

Arranged on a surface of a substrate are a patch conductor that radiates an electromagnetic field having been fed, a feed line that feeds the patch conductor with the electromagnetic field having been input, two slits parallel to the feed line on both sides of a connection part of the feed line toward an inner side of the patch conductor, and a ring conductor at a space from the patch conductor with an interposition of a gap to surround an outer periphery of the patch conductor. Accordingly, an electric capacitance can be formed between the patch conductor and the ring conductor, and when achieving impedance matching with the feed line, adjustment can be performed using the size of the ring conductor and the gap.

20 Claims, 17 Drawing Sheets

(56) References Cited

U.S. PATENT DOCUMENTS

| | | | | |
|---|---|---|---|---|
| 2003/0026920 | A1* | 2/2003 | Okumura | C23C 16/4412<br>156/345.48 |
| 2008/0087099 | A1* | 4/2008 | Allenberg | G01F 1/7088<br>73/861.08 |
| 2011/0254740 | A1* | 10/2011 | Maeda | H01Q 5/40<br>343/700 MS |
| 2014/0266974 | A1* | 9/2014 | Sharawi | H01Q 1/48<br>343/893 |
| 2015/0357720 | A1* | 12/2015 | Chen | H01Q 21/28<br>343/727 |
| 2015/0372372 | A1* | 12/2015 | Lee | H01Q 1/243<br>343/702 |
| 2018/0108989 | A1* | 4/2018 | De Flaviis | H01Q 9/0435 |
| 2019/0379118 | A1* | 12/2019 | Rmili | H01Q 21/08 |
| 2020/0076082 | A1* | 3/2020 | Nasimuddin | H01Q 9/0421 |
| 2024/0079760 | A1* | 3/2024 | Kuo | H01Q 9/0457 |

OTHER PUBLICATIONS

Rao, Ch. V. N. et al., "GaAs MMIC Low Noise Amplifier With Integrated High-Power Absorptive Receive Protection Switch," IEEE Microwave and Wireless Components Letters, vol. 28, No. 12, Dec. 2018, 3 pages.

* cited by examiner at 300GHz at 340GHz

CIRCUIT INTEGRATED ANTENNA

This patent application is a national phase filing under section 371 of PCT application no. PCT/JP2019/042877, filed on Oct. 31, 2019, which application is hereby incorporated herein by reference.

TECHNICAL FIELD

The present invention relates to an antenna integrated with a circuit, the antenna being mounted on an integrated circuit such as a monolithic microwave integrated circuit.

BACKGROUND

For higher functionality and larger capacity of a device, increase in frequency and size reduction of an integrated circuit or a radio frequency (RF) circuit are necessary. In particular, in an RF circuit for communication application, a signal transmission loss on the circuit is great in a high frequency band such as a millimeter wave/terahertz band. Therefore, a technique of designing a signal generator/an amplifier and a circuit of a transmission unit integrally to achieve low-loss signal transmission and size reduction is common. An integrated circuit in which such a technique is adopted is usually called a monolithic microwave integrated circuit (MMIC) (Non-Patent Literature 1). The use of a high frequency band as described above as a carrier wave produces an advantage that a wider bandwidth is easily achieved.

An operating band of an electronic device including nonlinearity such as a power amplifier or mixer has a characteristic of being determined by a ratio to a central frequency. Accordingly, since a fractional bandwidth can be obtained with a higher central frequency, the bandwidth becomes wider, and the amount of information of a baseband signal can be increased (Non-Patent Literature 2). In order to achieve a longer wireless transmission distance, a high-power, low-loss, and favorable signal-to-noise (SN) ratio is required, so that it is similarly desirable that an antenna responsible for the transmission unit also have a wide band and high gain.

In a case of an antenna integrated with a circuit, the antenna being mounted on an MMIC, representative structures include a patch antenna, a slot antenna, and the like. Their operating principles are basically similar to those of a dipole antenna, and a standing wave distribution of voltage and current determined from a structural boundary condition is formed (resonated) to radiate an electric field. The simple structure facilitates mounting, but on the other hand, general versatility is emphasized for performance as an antenna, and there is an inefficient portion under certain fixed conditions for the frequency band, directivity, transmission distance, and the like.

CITATION LIST

Non-Patent Literature

Non-Patent Literature 1: Ch. V. N. Rao, D. K. Ghodgaonkar, and N. Sharma, "GaAs MMIC Low Noise Amplifier With Integrated High-Power Absorptive Receive Protection Switch", IEEE Microwave and Wireless Components Letters, Vol. 28, pp. 1128-1130, December 2018.

Non-Patent Literature 2: G. Hau, T. B. Nishimura, and N. Iwata, "High Efficiency, Wide Dynamic Range Variable Gain and Power Amplifier MMICs for Wide-Band CDMA Handsets", IEEE Microwave and Wireless Components Letters, Vol. 11, pp. 13-15, January 2001.

SUMMARY

Technical Problem

In such a conventional structure, however, the directivity is poor, and a substantial radiation efficiency of radiated power from input to a specific receiving direction is bad, which raises a problem in that a transmission distance of a wireless transmission system including the antenna is shortened. Since the conventional structure is a single frequency resonance system, the radiation frequency response has properties having a peak at a single frequency, which raises a problem in that it is difficult to widen the bandwidth of the wireless transmission system including the antenna.

Embodiments of the present invention are intended to solve such problems, and provide an antenna integrated with a circuit in which directivity and gain can be improved significantly, and a broadband radiation property can be obtained.

Means for Solving the Problem

An antenna integrated with a circuit according to embodiments of the present invention is an antenna integrated with a circuit, the antenna being mounted on a substrate that constitutes an integrated circuit, including: a patch conductor that is formed on a surface of the substrate, and radiates an electromagnetic field having been fed; a feed line that is formed on the surface of the substrate, and feeds the patch conductor with the electromagnetic field having been input; two slits parallel to the feed line that are formed on both sides of a connection part between the patch conductor and the feed line to extend toward an inner side of the patch conductor; and a ring conductor that is formed on the surface of the substrate, and is arranged at a distance from the patch conductor with an interposition of a first gap to surround an outer periphery of the patch conductor.

Effects of Embodiments of the Invention

According to embodiments of the present invention, an electric capacitance can be formed between the patch conductor and the ring conductor, that is, at a gap, and when achieving impedance matching with the feed line, adjustment can be performed using the size of the ring conductor and the gap. Therefore, in a design process of the antenna integrated with a circuit, high control flexibility can be obtained for the central frequency, bandwidth, directivity, gain, and the like. Consequently, a field distribution of the antenna integrated with a circuit can be prevented from spreading and stabilized to improve the directivity.

DETAILED DESCRIPTION OF ILLUSTRATIVE EMBODIMENTS

Next, embodiments of the present invention will be described with reference to the drawings.

First Embodiment

Figure 1:
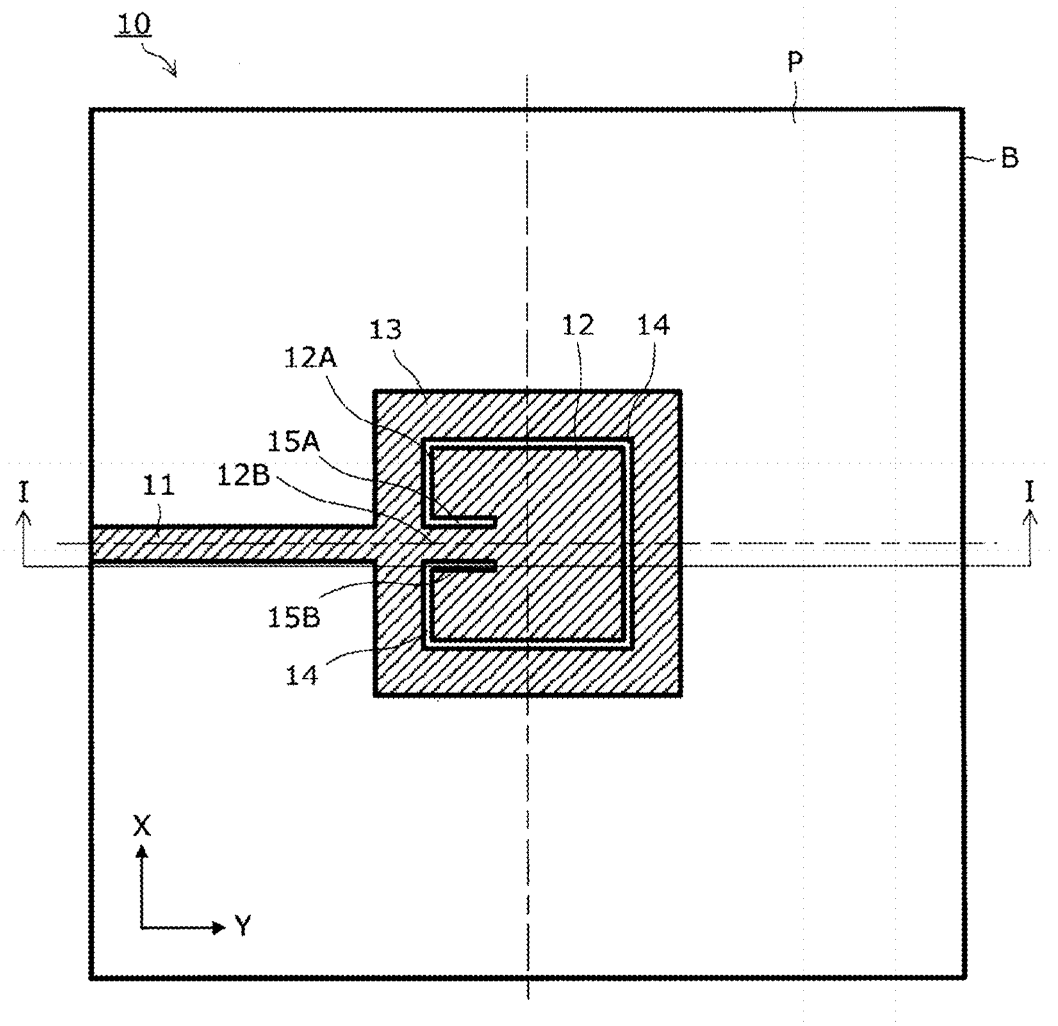
FIG. 1 is a plan view showing a configuration of an antenna integrated with a circuit according to a first embodiment.
Figure 2:
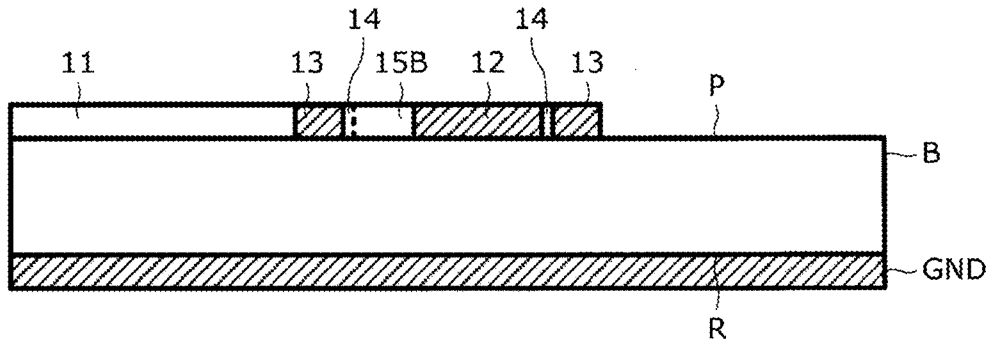
FIG. 2 is a sectional view taken along the line I-I in FIG. 1.

First, an antenna 10 integrated with a circuit according to a first embodiment of the present invention will be described with reference to FIG. 1 and FIG. 2. FIG. 1 is a plan view showing a configuration of the antenna integrated with a circuit according to the first embodiment. FIG. 2 is a sectional view taken along the line I-I in FIG. 1.

The antenna 10 integrated with a circuit according to embodiments of the present invention is an antenna formed on a dielectric substrate B constituting an integrated circuit such as a monolithic microwave integrated circuit (hereinafter referred to as an MMIC) through a common semiconductor process technology. Hereinafter, the antenna 10 integrated with a circuit may be referred to as an on-chip antenna.

As shown in FIG. 1 and FIG. 2, the antenna 10 integrated with a circuit is mainly composed of a feed line 11, a patch conductor 12, a ring conductor 13, and a gap 14 (a first gap) which are formed on a front surface P of the substrate B. As shown in FIG. 2, a ground plane GND is formed at least in a region opposed to the feed line 11, the patch conductor 12, and the ring conductor 13 on a bottom surface R of the substrate B.

The feed line 11 is a transmission line made of a microstrip line as a whole, and is intended to feed the patch conductor 12 and the ring conductor 13 with an externally input high-frequency electromagnetic field. Hereinafter, for ease of description, a direction in which the feed line 11 extends on the front surface P (the lateral direction on the sheet of drawing) will be called a direction Y, and a direction orthogonal to the direction Y (the vertical direction on the sheet of drawing) will be called a direction X.

The patch conductor 12 is an antenna element (radiation element) that radiates an electromagnetic field fed from the feed line 11 with the feed line 11 being connected to a connection part 12B positioned at the center of one side 12A.

The ring conductor 13 is a conductor arranged at a distance from the patch conductor 12 with the interposition of the gap 14 to surround the outer periphery of the patch conductor 12 in a ring manner. The ring conductor 13 is formed as a strip with a constant width at a distance from the patch conductor 12 by an interval equivalent to the annular gap 14 having a constant width, and has both ends connected to the feed line 11 in proximity to the connection part 12B.

To achieve impedance matching with the feed line 11, two slits 15A and 15B parallel to the feed line 11 in the direction Y are formed on both sides of the connection part 12B of the patch conductor 12 in a manner extending from the end of the patch conductor 12 toward the inner side. Two ends of the gap 14 are respectively formed to communicate with one end of each of the slits 15A and 15B. The slits 15A and 15B have a length shorter than the width of the patch conductor 12 in the direction Y.

Hereinafter, a case in which the feed line 11 is formed linearly will be described as an example, but this is not a limitation, and a bent portion, a curved portion, and furthermore, a stub may be provided in the middle. A case in which the outer shape of the patch conductor 12 and the ring conductor 13 presents a generally square shape will be described as an example, but this is not a limitation, and another shape such as a generally rectangular shape or a generally circular shape may be adopted. A case in which the inner shape of the ring conductor 13 presents a generally square shape will be described as an example, but this is not a limitation, and a shape conformed to the outer shape of the patch conductor 12 in such a manner that the gap 14 has a constant width may be adopted. Note that the width of the gap 14 may not be constant along the entire periphery (entire length), but the width at each part may be changed to adjust the field strength distribution of the patch conductor 12.

A case of using a substrate made of a compound semiconductor such as InP (indium phosphide) as the substrate B will be described as an example, but this is not a limitation, and a common dielectric substrate for use in a high-frequency circuit may be used. A case of using thin films of gold (Au) as thin film conductors such as the feed line 11, the patch conductor 12, and the ring conductor 13 will be described as an example, but this is not a limitation, and common metallic thin film conductors for use in a high-frequency circuit may be used.

In the antenna 10 integrated with a circuit according to the present embodiment, the ring conductor 13 is arranged to surround the outer periphery of the patch conductor 12 in addition to the slits 15A and 15B at the connection part of the feed line 11, as shown in FIG. 1. This enables an electric capacitance to be formed between the patch conductor 12 and the ring conductor 13, that is, at the gap 14. Therefore, when achieving impedance matching with the feed line 11, adjustment can be performed using the size of the ring conductor 13 and the gap 14 in addition to the size of the slits 15A and 15B. Consequently, in the design procedure of the antenna 10 integrated with a circuit, high control flexibility can be obtained for the central frequency, bandwidth, directivity, gain, and the like, and as a result, the field distribution of the antenna 10 integrated with a circuit can be prevented from spreading and stabilized to improve the directivity.

Operation Analysis According to the First Embodiment

Next, analysis results obtained by simulations will be described with reference to FIG. 3 to FIG. 11 as an operation of the antenna 10 integrated with a circuit according to the present embodiment. Hereinafter, an analysis result for a conventional patch antenna will also be described together for comparison.

Figure 3:
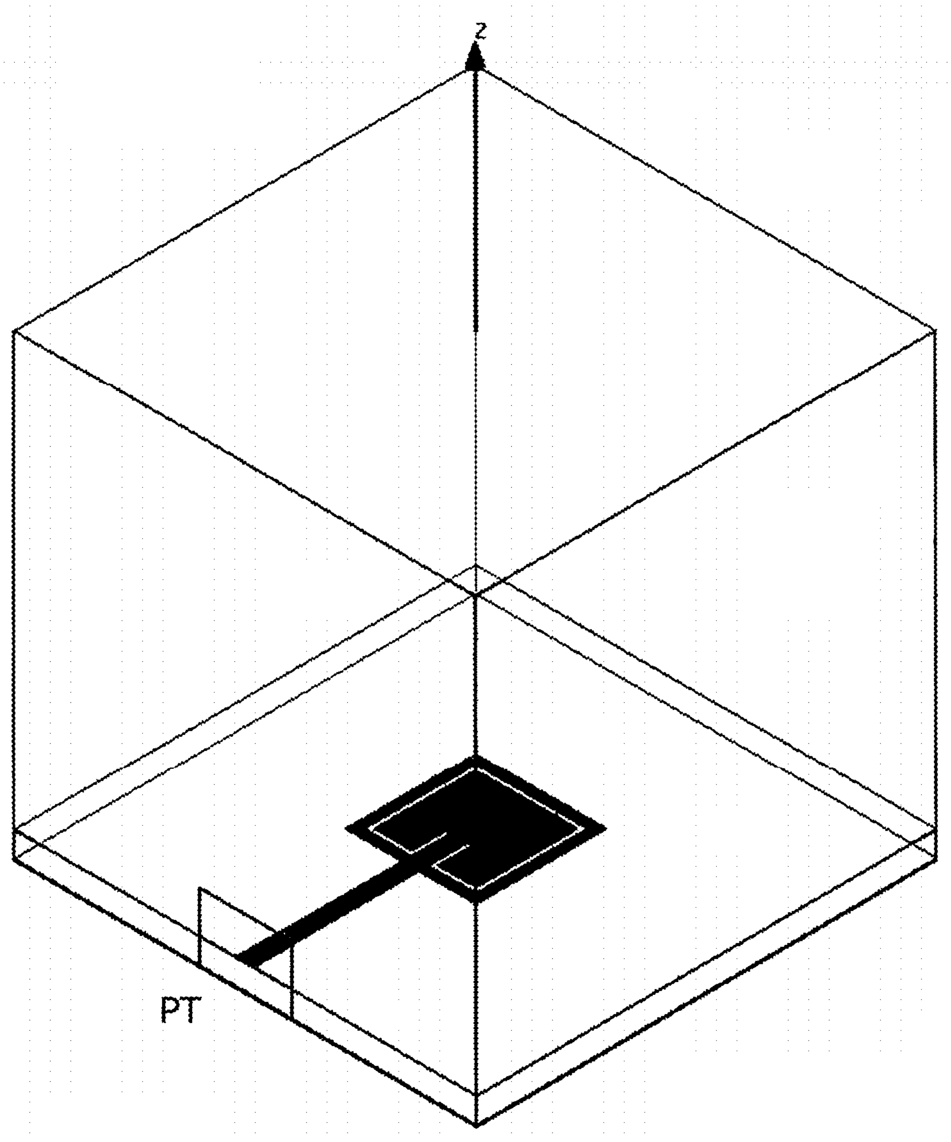
FIG. 3 is a diagram for describing analysis conditions for the antenna integrated with a circuit according to the first embodiment.
Figure 4:
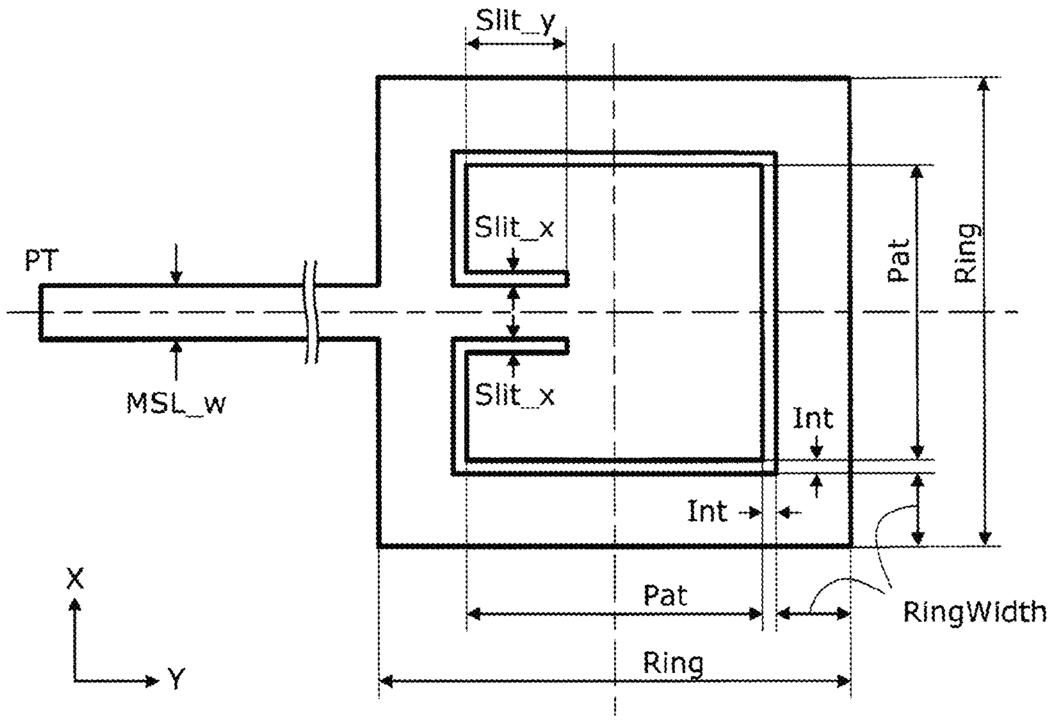
FIG. 4 is an explanatory diagram showing an antenna size of the antenna integrated with a circuit according to the first embodiment.
Figure 5:
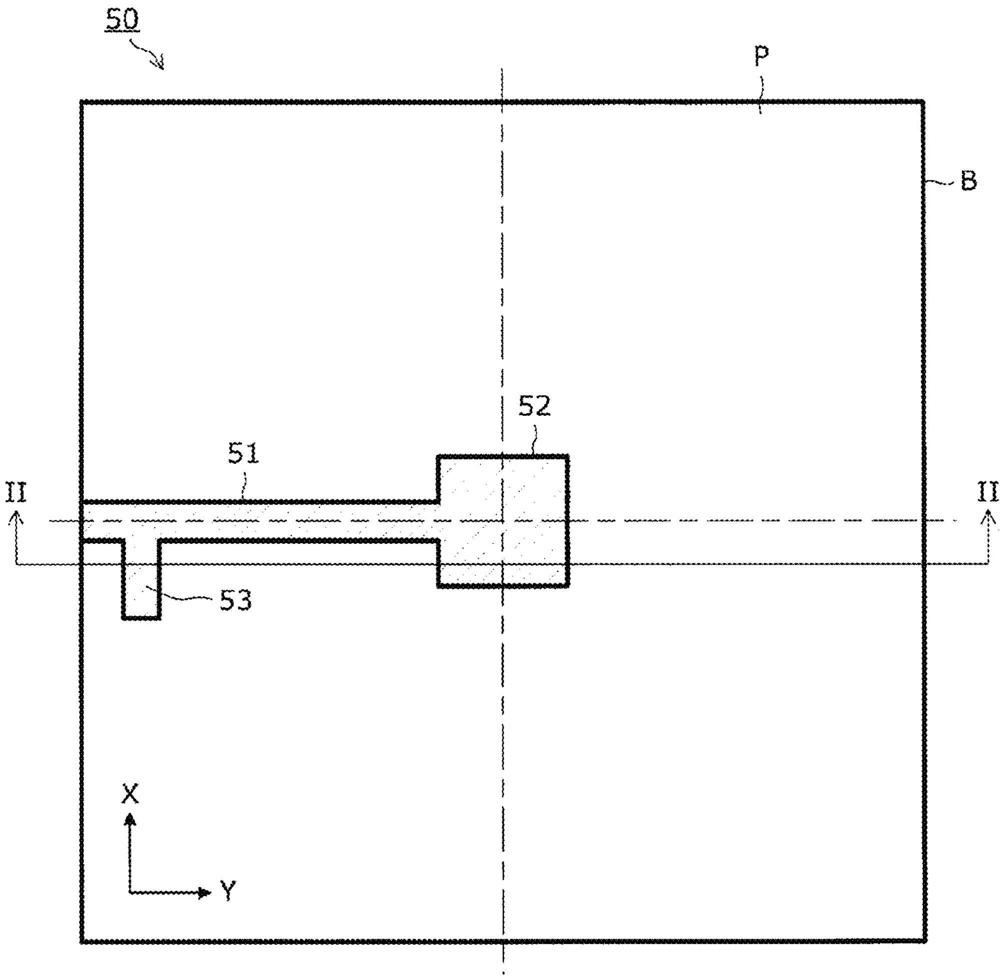
FIG. 5 is a plan view showing a configuration of a conventional patch antenna.
Figure 6:
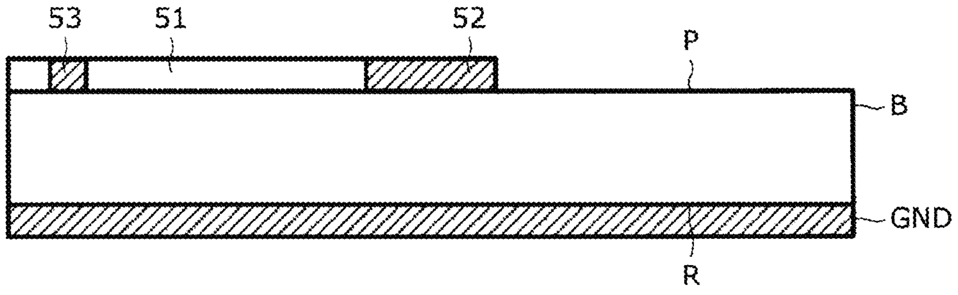
FIG. 6 is a sectional view taken along the line II-II in FIG. 5.
Figure 7:
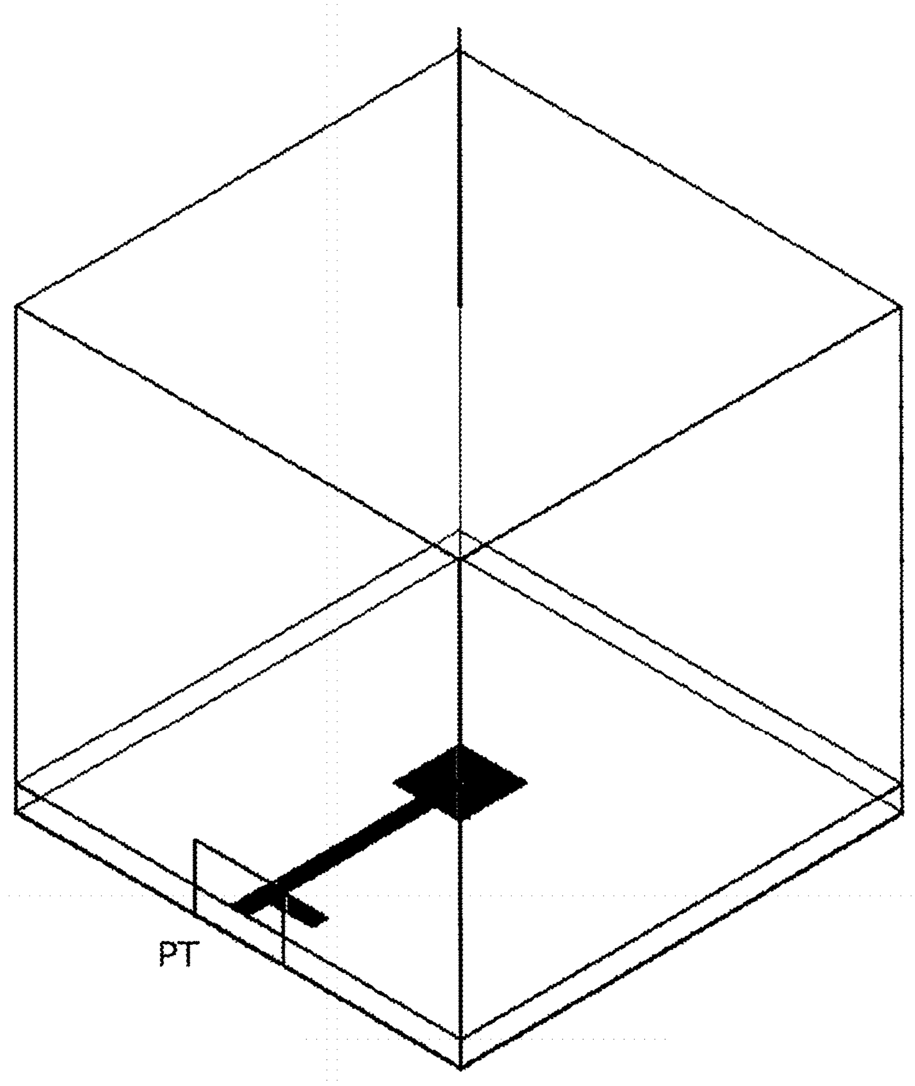
FIG. 7 is a diagram for describing analysis conditions for the conventional patch antenna.
Figure 8:
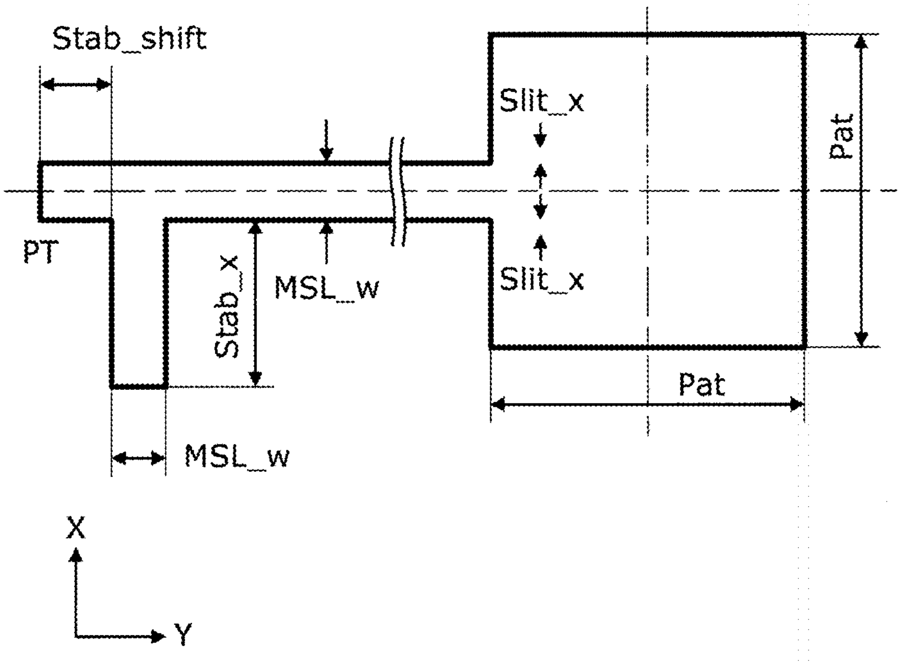
FIG. 8 is an explanatory diagram showing an antenna size of the conventional patch antenna.
Figure 9A:
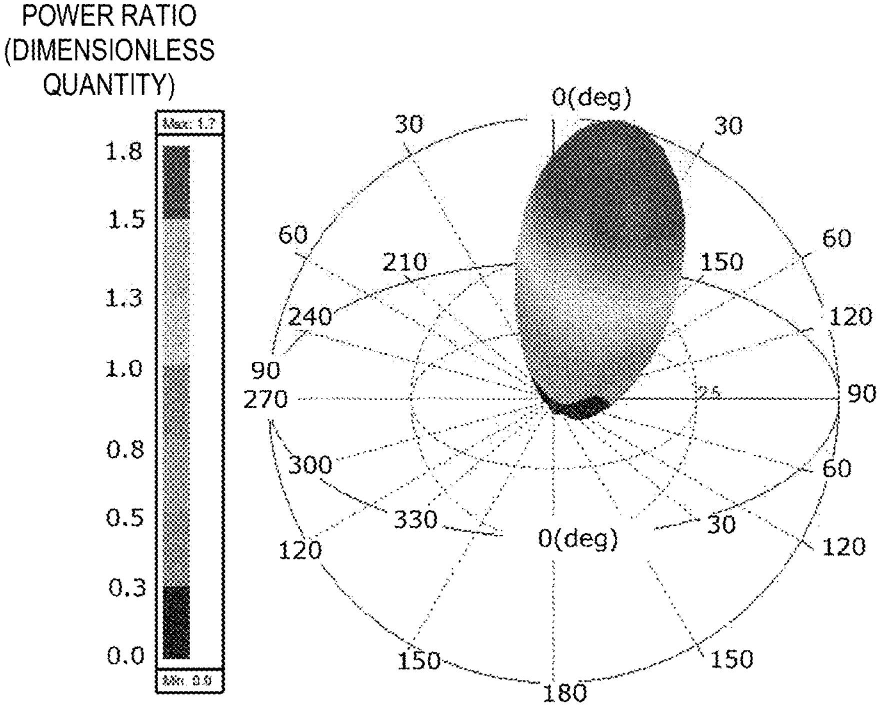
FIG. 9A is an explanatory diagram showing an analysis result (power ratio) of the antenna integrated with a circuit according to the first embodiment.
Figure 9B:
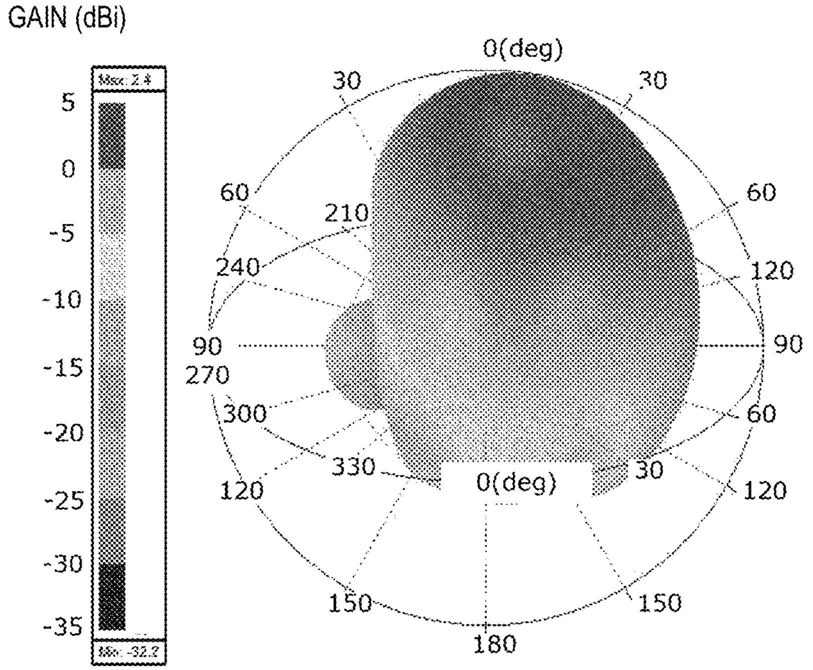
FIG. 9B is an explanatory diagram showing an analysis result (gain) of the antenna integrated with a circuit according to the first embodiment.
Figure 10A:
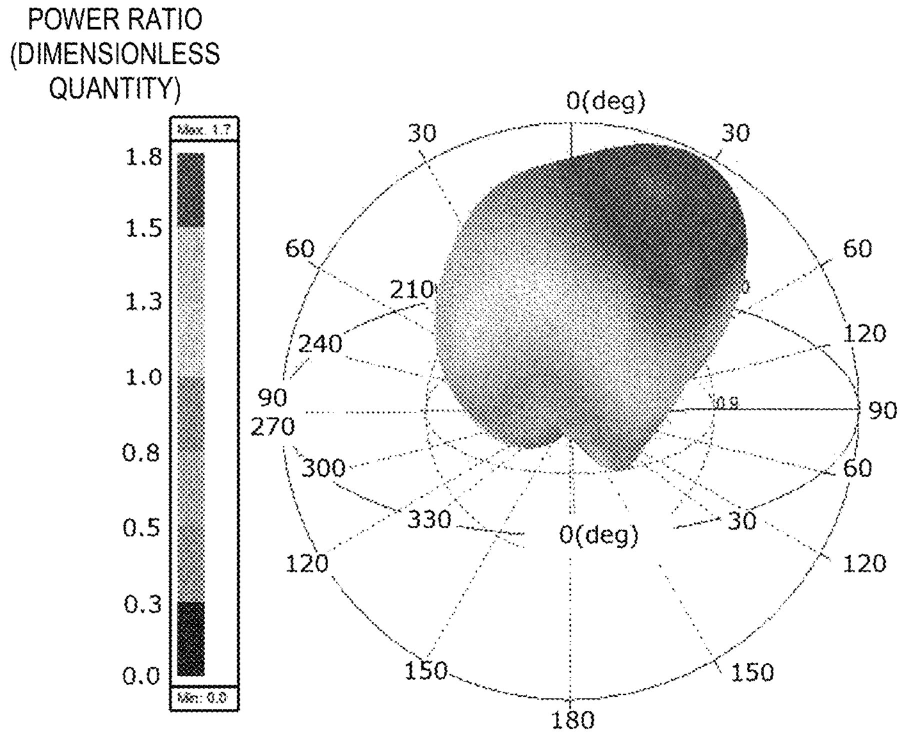
FIG. 10A is an explanatory diagram showing an analysis result (power ratio) of the conventional patch antenna.
Figure 10B:
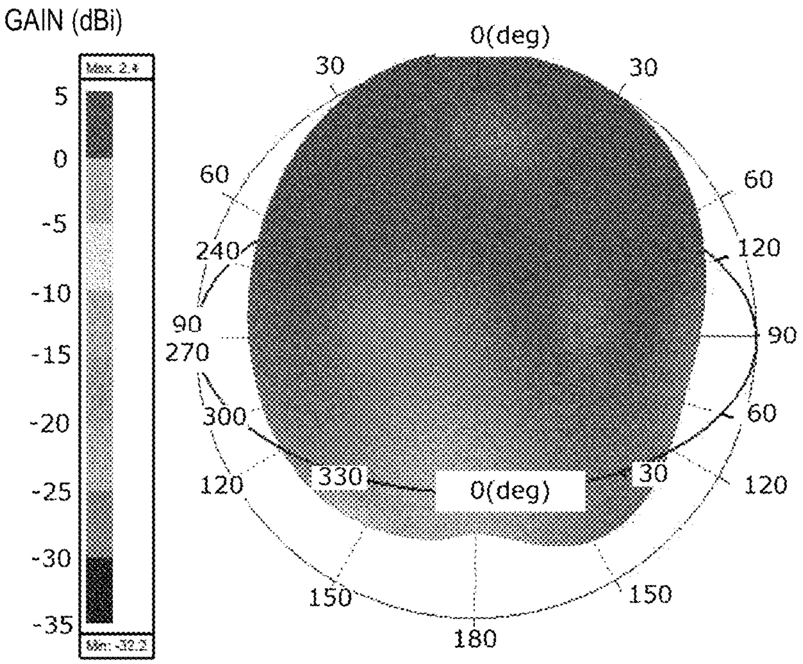
FIG. 10B is an explanatory diagram showing an analysis result (gain) of the conventional patch antenna.
Figure 11:
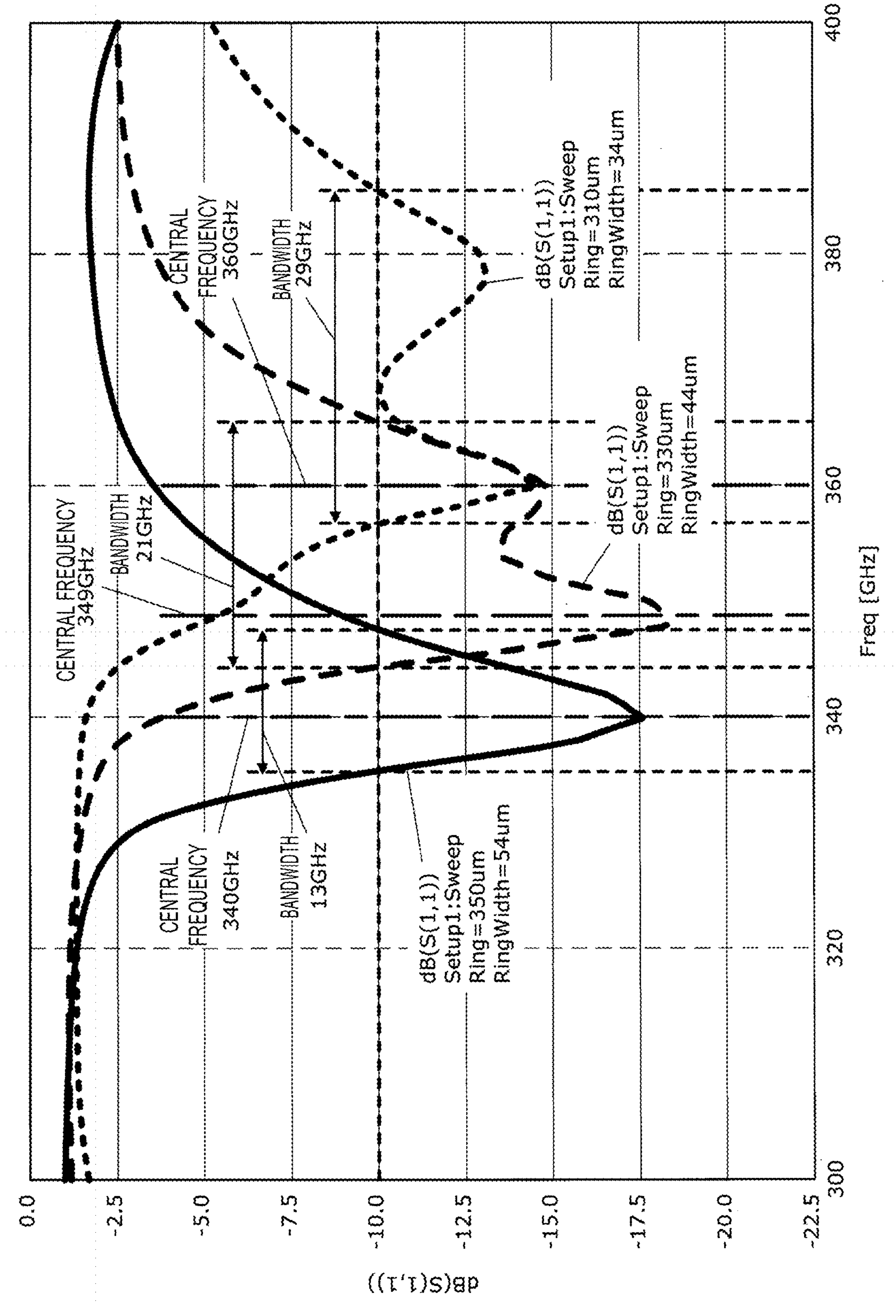
FIG. 11 is a graph showing frequency responses of a reflection coefficient for the antenna integrated with a circuit according to the first embodiment.

FIG. 3 is a diagram for describing analysis conditions for the antenna integrated with a circuit according to the first embodiment. FIG. 4 is an explanatory diagram showing an antenna size of the antenna integrated with a circuit according to the first embodiment. FIG. 5 is a plan view showing a configuration of the conventional patch antenna. FIG. 6 is a sectional view taken along the line II-II in FIG. 5. FIG. 7 is a diagram for describing analysis conditions for the conventional patch antenna. FIG. 8 is an explanatory diagram showing an antenna size of the conventional patch antenna. FIGS. 9A and 9B include explanatory diagrams showing analysis results of the antenna integrated with a circuit according to the first embodiment. FIGS. 10A and 10B include explanatory diagrams showing analysis results of the conventional patch antenna. FIG. 11 is a graph showing frequency responses of a reflection coefficient for the antenna integrated with a circuit according to the first embodiment.

As to the analysis conditions for the antenna 10 integrated with a circuit shown in FIG. 3, the frequency band is set at 300 to 400 GHz, and an analysis distance is set at 1000 μm×1000 μm×1000 μm. Gold (Au) having a film thickness of 3 μm is used as thin film conductors of the feed line 11, the patch conductor 12, and the ring conductor 13. An InP substrate having a thickness of 55 μm is used as the substrate B, and gold (Au) having a thickness of 4 μm is used as the ground plane GND. The size of a port PT provided on one end of the feed line 11 is set at 200 μm (W)×150 μm (H), and an electromagnetic field of 1 W is input through the port PT.

As shown in FIG. 4, as to the antenna size for the antenna 10 integrated with a circuit according to the present embodiment, the vertical and horizontal width of the patch conductor 12, that is, a patch size Pat is set at 220 μm, a width MSL_w of the feed line 11 is set at 36 μm, the vertical and horizontal width of the ring conductor 13, that is, a ring size Ring is set at 282 μm, a strip width RingWidth of the ring conductor 13 is set at 20 μm, a width Int of the gap 14 is set at 11 μm, a width Slit_x of the slits 15A and 15B is set at 10 μm, and a length Slit_y of the slits 15A and 15B is set at 74 μm.

On the other hand, a conventional patch antenna 50 used as a comparison target is composed of a feed line 51, a patch conductor 52, and a stub 53 which are formed on the front surface P of the substrate B, as shown in FIG. 5 and FIG. 6. The patch antenna 50 is a common patch antenna in which the patch conductor 52 which is an antenna element (radiation element) is provided with the stub 53 in the middle of the feed line 51 that supplies an electromagnetic field in a manner protruding from the feed line 51 in the direction X. The ground plane GND is formed on the bottom surface R of the substrate B.

As to analysis conditions for the conventional patch antenna 50 shown in FIG. 7, the frequency band is set at 250 to 350 GHz, and the analysis distance is set at 1000 μm×1000 μm×1000 μm. Gold (Au) having a film thickness of 3 μm is used as thin film conductors of the feed line 51, the patch conductor 52, and the stub 53. An InP substrate having a thickness of 55 μm is used as the substrate B, and gold (Au) having a thickness of 4 μm is used as the ground plane GND. The size of the port PT provided on one end of the feed line 11 is set at 200 μm (W)×150 μm (H), and an electromagnetic field of 1 W is input through the port PT.

As shown in FIG. 8, as to the antenna size for the conventional patch antenna 50, the vertical and horizontal width of the patch conductor 52, that is, the patch size Pat is set at 150 μm, the width MSL_w of the feed line 11 and the stub 53 is set at 36 μm, a distance Stab_shift from the port PT to the stub 53 is set at 50 μm, and a length Stab_x of the stub 53 protruding from the feed line 11 is set at 97 μm.

FIG. 9A and FIG. 9B show analysis results of the antenna 10 integrated with a circuit according to the present embodiment, and antenna parameters at 342 GHz are as described below.

Directivity: 5.65 dBi
Gain: 4.97 dBi
Radiation efficiency: 87.9%
Overall efficiency: 85.8%

FIG. 10A and FIG. 10B show analysis results of the conventional patch antenna 50, and antenna parameters at 288 GHz are as described below.

Directivity: 2.74 dBi
Gain: 2.24 dBi
Radiation efficiency: 81.6%
Overall efficiency: 38.3%

It is understood that, in the conventional patch antenna 50, the radiation electrolytic pattern spreads widely, and the maximum gain is approximately 2.24 dBi, while, with the antenna 10 integrated with a circuit according to the present embodiment, the radiation electrolytic pattern spreads little, and the electromagnetic field is efficiently radiated upward. It is also understood that the maximum gain is 4.97 dBi, which is more than or equal to twice that of the conventional patch antenna 50, and a significant improvement is obtained.

FIG. 11 shows frequency responses of an input reflection coefficient S11 at the input end (port) of the feed line 11 as an analysis result of the antenna 10 integrated with a circuit according to the present embodiment. It is understood that, with the antenna 10 integrated with a circuit according to the present embodiment, the central frequency can be adjusted by mainly changing the patch size Pat of the patch conductor 12 as shown in FIG. 11. For example, in the case in which the patch size Pat is set at 350 μm, the central frequency is about 340 GHz, and in the case in which the patch size Pat is set at 310 μm, the central frequency is about 360 GHz.

It is also understood that, with the antenna 10 integrated with a circuit according to the present embodiment, the bandwidth at radiation can be widened by reducing the ring size RingWidth of the ring conductor 13 as shown in FIG. 11. This tendency is also confirmed in a state in which the interval between the patch conductor 12 and the ring conductor 13, that is, the width Int of the gap 14 is made constant, and by maintaining the state in which the width Int of the gap 14 is made constant, the bandwidth can be changed while holding a state in which matching conditions during feeding are not deviated considerably.

With the antenna 10 integrated with a circuit according to the present embodiment, a resonance mode on the ring conductor 13 side can be changed by changing the ring size RingWidth of the ring conductor 13 as shown in FIG. 11. Thus, the bandwidth of an attenuation property (≈radiation property) can be widened by overlapping a plurality of resonance points. For example, it is understood that the bandwidth of the input reflection coefficient S11 at −10.0 dB is about 13 GHz in a case in which the ring size RingWidth is set at 54 μm, but is widened to about 29 GHz in a case in which the ring size RingWidth is set at 34 μm.

Effects of the First Embodiment

As described above, in the present embodiment, the ring conductor 13 is arranged at a distance from the patch conductor 12 with the interposition of the gap 14 to surround the outer periphery of the patch conductor 12, in addition to the slits 15A and 15B at the connection part of the feed line 11.

This enables an electric capacitance to be formed between the patch conductor 12 and the ring conductor 13, that is, at the gap 14. Therefore, when achieving impedance matching with the feed line 11, adjustment can be performed using the size of the ring conductor 13 and the gap 14 in addition to the size of the slits 15A and 15B. Therefore, in the design procedure of the antenna 10 integrated with a circuit, high control flexibility can be obtained for the central frequency, bandwidth, directivity, gain, and the like.

Consequently, the field distribution of the antenna 10 integrated with a circuit can be prevented from spreading and can be stabilized to improve the directivity. Since this enables the directivity and gain of the on-chip antenna to be improved significantly, wireless communication can be performed at a longer distance. Since a broadband radiation property is obtained, the amount of information that can be transmitted increases, so that a larger capacity of wireless communication in the millimeter wave band/terahertz band throughout the whole system can be expected. On the other hand, from the perspective of chip design, the high design flexibility enables the central frequency/bandwidth of the radiation property to be changed without changing basic design elements such as the configuration and size of the antenna. Impedance matching can be easily achieved merely through parameter optimization without using a stub or the like.

The antenna 10 integrated with a circuit according to the present embodiment has been described from the perspective of individual design, but this is not a limitation, and a plurality of antennas 10 integrated with circuits may be disposed into an array. On that occasion, since an antenna element having a better directivity can relieve a problem such as electromagnetic field coupling between elements, the element interval can be made smaller than in the conventional patch antenna, and size reduction and improvement of beam controllability can be expected.

Second Embodiment

Figure 12:
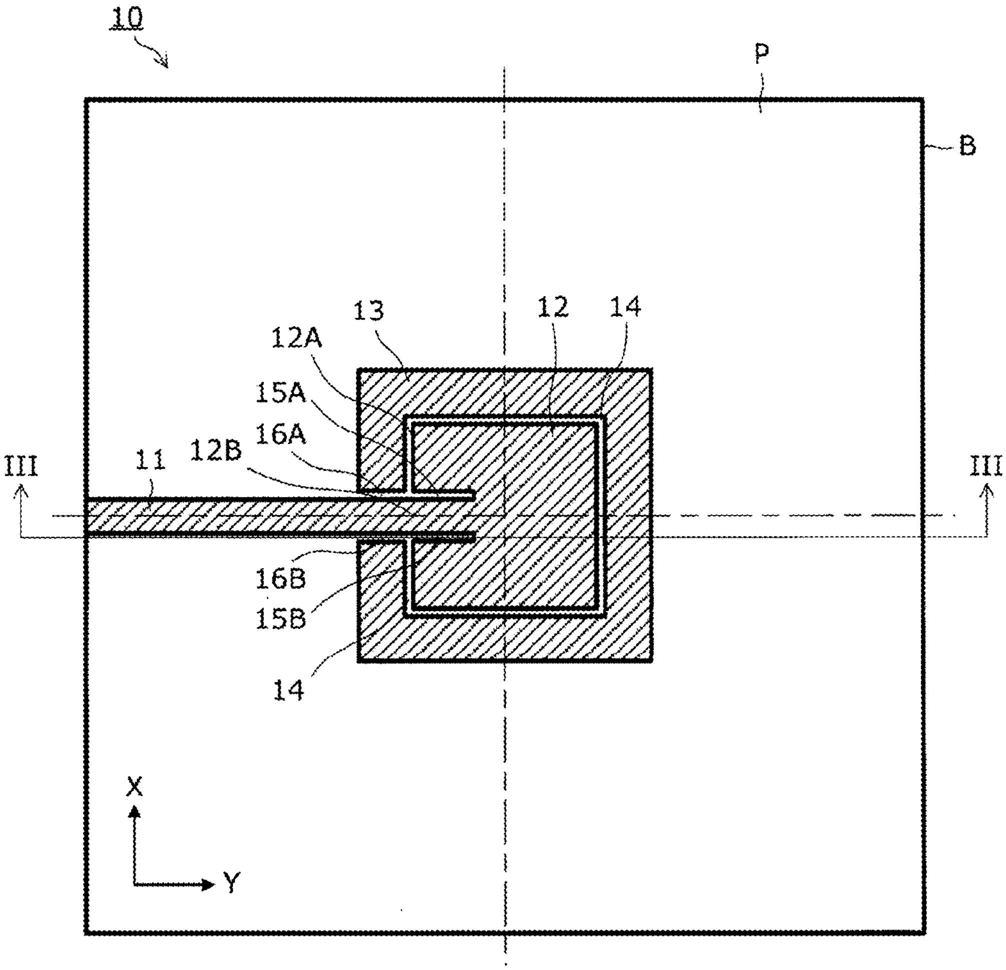
FIG. 12 is a plan view showing a configuration of an antenna integrated with a circuit according to a second embodiment.
Figure 13:
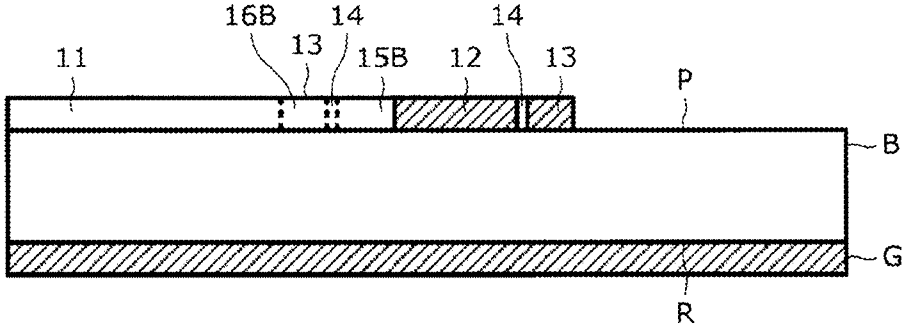
FIG. 13 is a sectional view taken along the line III-III in FIG. 12.

Next, the antenna 10 integrated with a circuit according to a second embodiment of the present invention will be described with reference to FIG. 12 and FIG. 13. FIG. 12 is a plan view showing a configuration of the antenna integrated with a circuit according to the second embodiment. FIG. 13 is a sectional view taken along the line III-III in FIG. 12.

The antenna 10 integrated with a circuit according to the present embodiment will be described as to a case in which the ring conductor 13 is electrically separated from the feed line 11 to be brought into a passive state as shown in FIG. 12 and FIG. 13.

In other words, in the antenna 10 integrated with a circuit according to the present embodiment, the ring conductor 13 is formed as a strip at a distance from the patch conductor 12 by an interval equivalent to the annular gap 14 having a constant width as shown in FIG. 12. Both ends of the ring conductor 13 are arranged at a distance from the feed line 11 by virtue of the gaps 16A and 16B (second gap) in proximity to the connection part 12B. Accordingly, the field strength in the vicinity of the connection part 12B can be increased, and the field distribution concentrated on each of four, i.e., upper, lower, left, and right, surfaces of the patch conductor 12 can be equalized to improve and stabilize the directivity further. Note that in FIG. 12 and FIG. 13, the gap 14 and the gaps 16A and 16B are formed to communicate with the respective ends of each of the slits 15A and 15B, but even if the gaps 16A and 16B do not communicate with the respective ends of each of the slits 15A and 15B, the field strength in the vicinity of the connection part 12B can be increased.

Analysis Results According to the Second Embodiment

Figure 14:
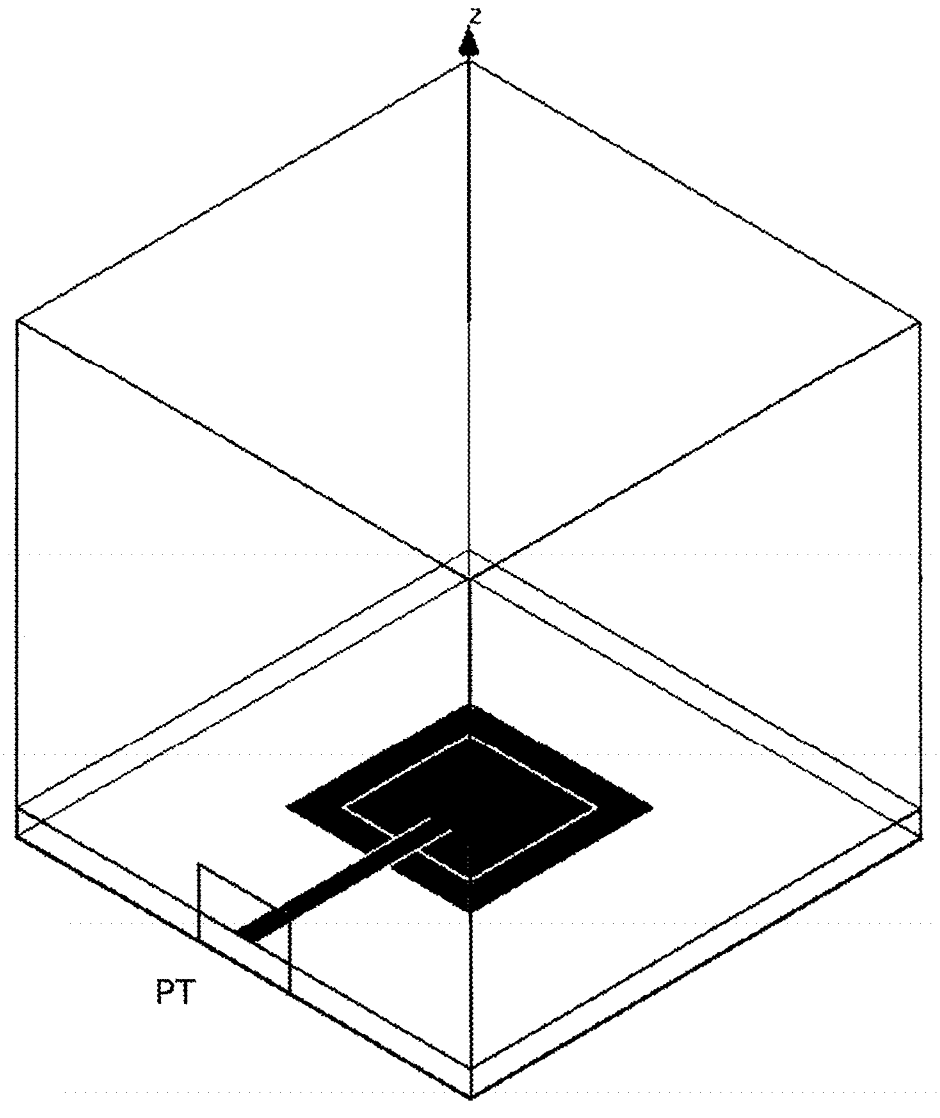
FIG. 14 is a diagram for describing analysis conditions for the antenna integrated with a circuit according to the second embodiment.
Figure 15:
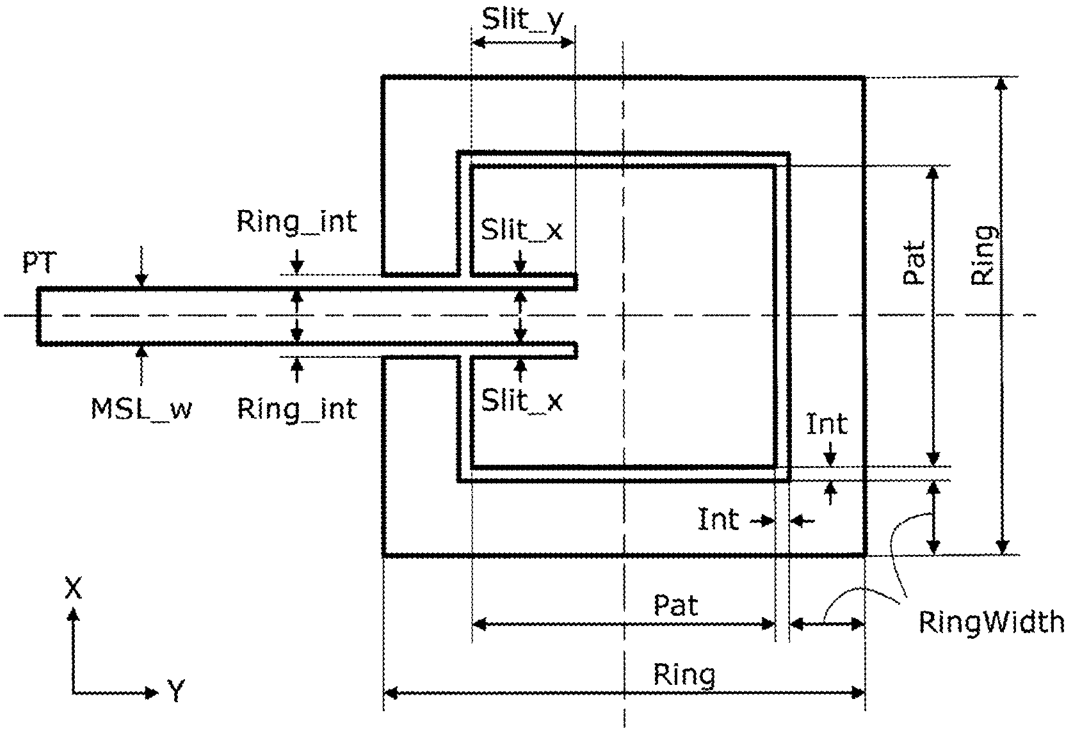
FIG. 15 is an explanatory diagram showing an antenna size of the antenna integrated with a circuit according to the second embodiment.
Figure 16A:
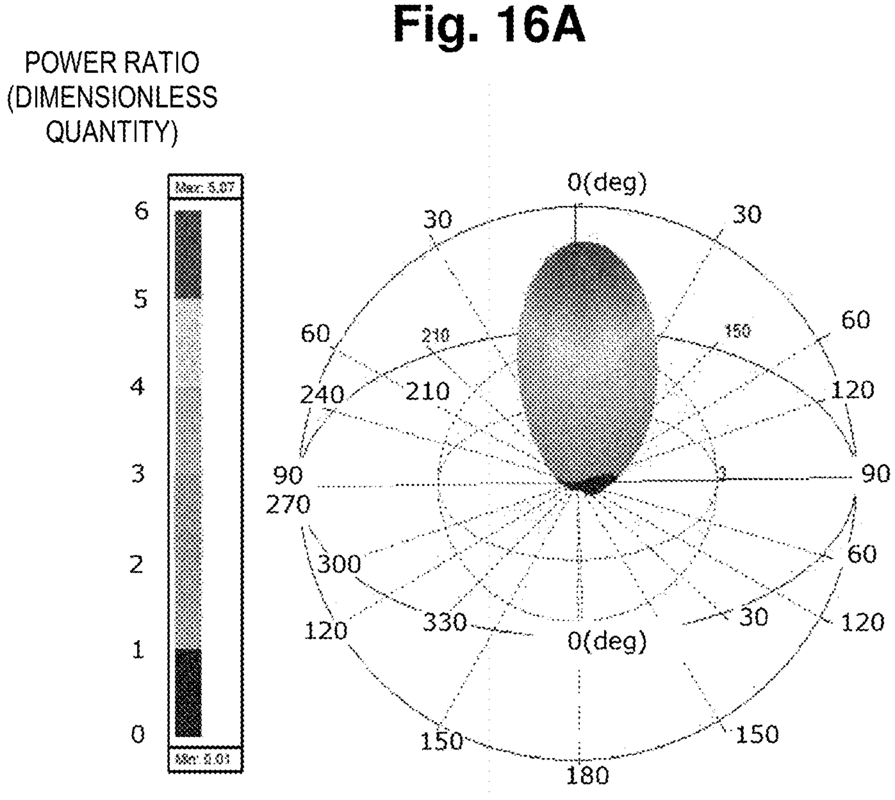
FIG. 16A is an explanatory diagram showing an analysis result (power ratio) of the antenna integrated with a circuit according to the second embodiment.
Figure 16B:
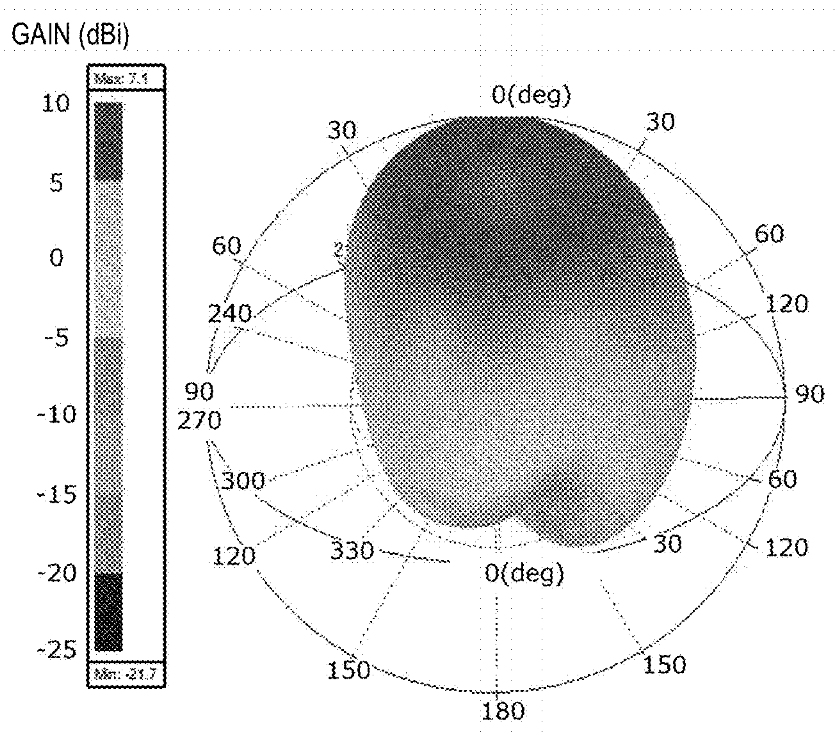
FIG. 16B is an explanatory diagram showing an analysis result (gain) of the antenna integrated with a circuit according to the second embodiment.
Figure 17:
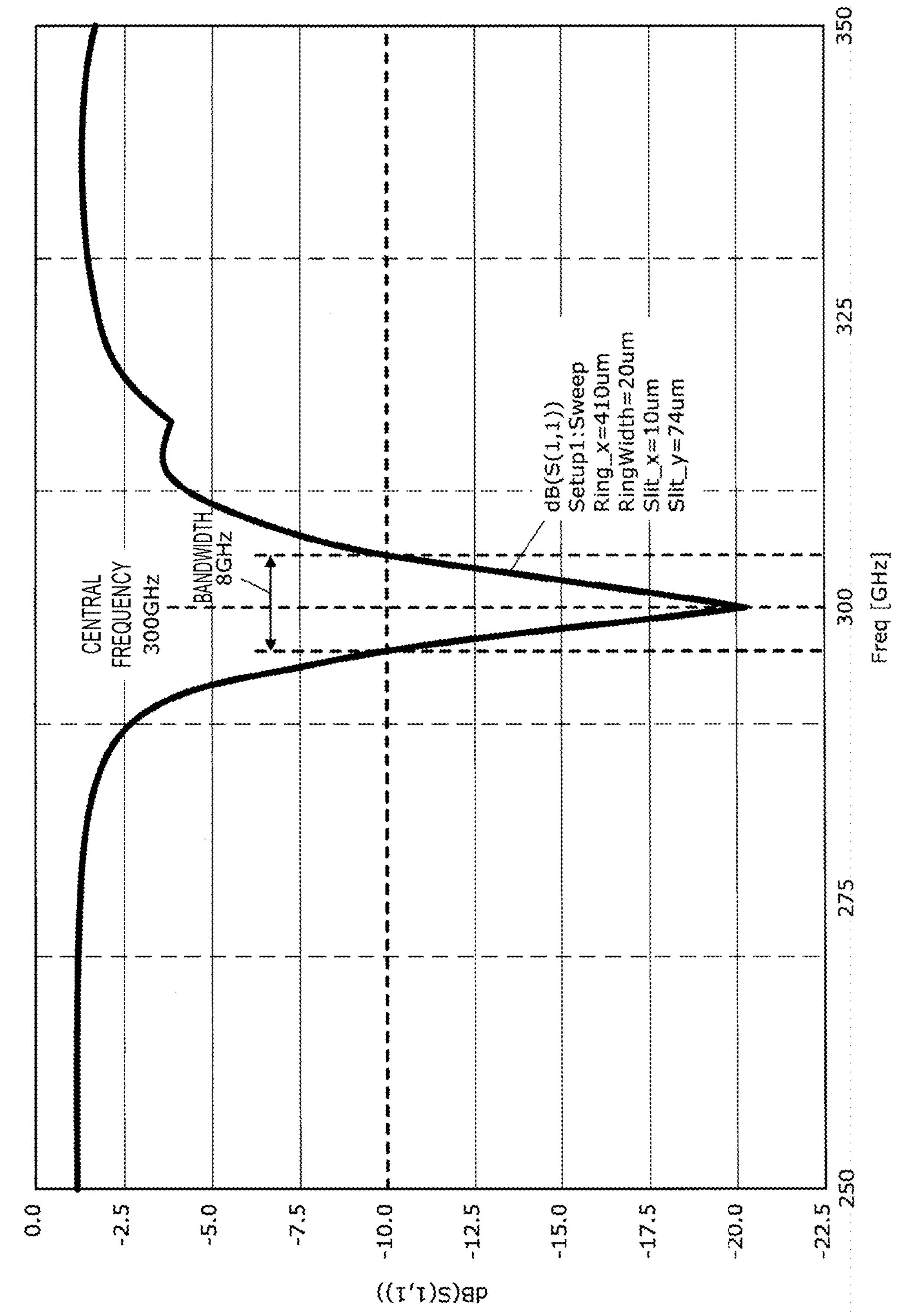
FIG. 17 is a graph showing a frequency response of a reflection coefficient for the antenna integrated with a circuit according to the second embodiment.

Next, analysis results obtained by simulations for the antenna 10 integrated with a circuit according to the present embodiment and the conventional patch antenna will be described with reference to FIG. 14 to FIG. 17. FIG. 14 is a diagram for describing analysis conditions for the antenna integrated with a circuit according to the second embodiment. FIG. 15 is an explanatory diagram showing the antenna size of the antenna integrated with a circuit according to the second embodiment. FIG. 16A and FIG. 16B are explanatory diagrams showing analysis results of the antenna integrated with a circuit according to the second embodiment. FIG. 17 is a graph showing a frequency response of a reflection coefficient for the antenna integrated with a circuit according to the second embodiment.

As to the analysis conditions for the antenna 10 integrated with a circuit shown in FIG. 14, the frequency band is set at 250 to 350 GHz, and the analysis distance is set at 1000 μm×1000 μm×1000 μm. Gold (Au) having a film thickness of 3 μm is used as thin film conductors of the feed line 11, the patch conductor 12, and the ring conductor 13. An InP substrate having a thickness of 55 μm is used as the substrate B, and gold (Au) having a thickness of 4 μm is used as the ground plane GND. The size of the port PT provided on one end of the feed line 11 is set at 200 μm (W)×150 μm (H), and an electromagnetic field of 1 W is input through the port PT.

As shown in FIG. 15, as to the antenna size for the antenna 10 integrated with a circuit according to the present embodiment, the vertical and horizontal width of the patch conductor 12, that is, the patch size Pat is set at 250 μm, the width MSL_w of the feed line 11 is set at 36 μm, the vertical and horizontal width of the ring conductor 13, that is, the ring size Ring is set at 410 μm, the strip width RingWidth of the ring conductor 13 is set at 20 μm, the width Int of the gap 14 is set at 11 μm, the width Slit_x of the slits 15A and 15B is set at 10 μm, the length Slit_y of the slits 15A and 15B is set at 74 μm, and a width Ring_int of the gaps 16A and 16B is set at 10 μm.

FIG. 16A and FIG. 16B are analysis results of the antenna 10 integrated with a circuit according to the present embodiment, and antenna parameters at 300 GHz are as described below.

Directivity: 5.9 dBi
Gain: 5.07 dBi
Radiation efficiency: 85.9%
Overall efficiency: 85.1%

It is understood that, with the antenna 10 integrated with a circuit according to the present embodiment, spread of the radiation electrolytic pattern is kept small, and the electromagnetic field is efficiently radiated upward, similarly to FIG. 9A and FIG. 9B. In particular, the directivity at the central frequency of 300 GHz is 5.90 dBi, and a directivity as high as twice 2.74 dBi in FIG. 10A and FIG. 10B is obtained. It is also understood that the maximum gain is 5.07 dBi, which is more than or equal to twice that of the conventional patch antenna 50, and a significant improvement is obtained, similarly to FIG. 9A and FIG. 9B.

FIG. 17 shows a frequency response of the input reflection coefficient S11 at the input end (port) of the feed line 11 as an analysis result of the antenna 10 integrated with a circuit according to the present embodiment. With regard to the central frequency for the antenna 10 integrated with a circuit according to the present embodiment, the central frequency is adjusted to be about 300 GHz by mainly setting the patch size Pat of the patch conductor 12 at 250 μm, as shown in FIG. 17. It is also understood that the bandwidth of the input reflection coefficient S11 at −10.0 dB is about 8 GHz, and is adjusted to be substantially symmetric laterally about the central frequency of 300 GHz.

Figure 18:
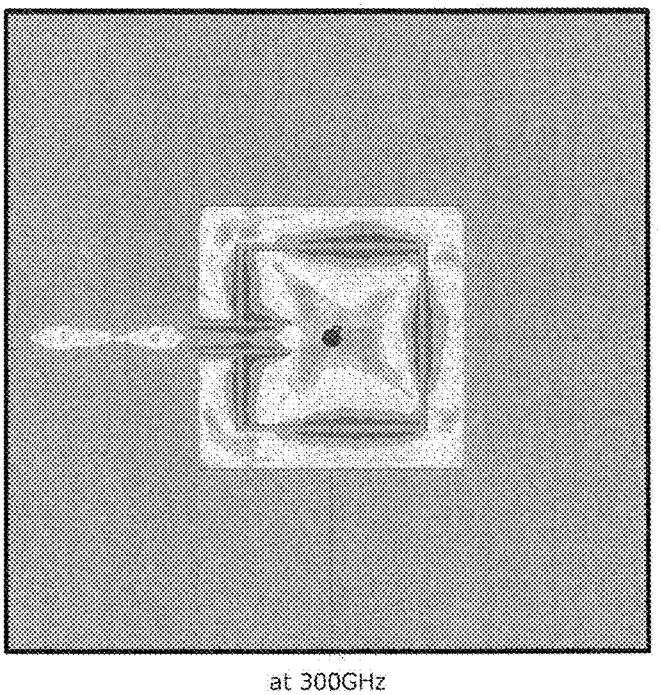
FIG. 18 is an explanatory diagram showing a field strength distribution of the antenna integrated with a circuit according to the second embodiment.
Figure 19:
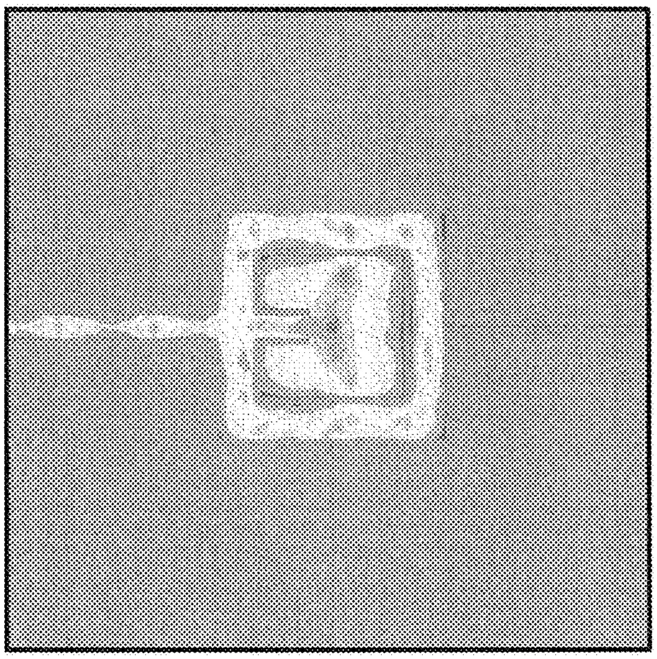
FIG. 19 is an explanatory diagram showing a field strength distribution of the antenna integrated with a circuit according to the first embodiment.

FIG. 18 is an explanatory diagram showing a field strength distribution of the antenna integrated with a circuit according to the second embodiment. FIG. 19 is an explanatory diagram showing a field strength distribution of the antenna integrated with a circuit according to the first embodiment.

The field strength distribution within the antenna surface used in FIG. 1 is in a state in which the field distribution on the microstrip line of the feed line 11 is weak, and only the field distribution on the line between the slits 15A and 15B is slightly weak, as shown in FIG. 19.

On the other hand, it is understood that the field strength concentrates on the line between the slits 15A and 15B and between the gaps 16A and 16B in the antenna 10 integrated with a circuit according to the present embodiment as shown in FIG. 18, and field strength distributions of opposite two sides of the patch and their peripheral part have symmetry. It is considered that, by forming the field distribution within the antenna surface symmetrically about the feed line direction and the direction vertical to the feed line direction, the directivity is improved.

In the antenna 10 integrated with a circuit according to the present embodiment, the central frequency and bandwidth are adjustable by mainly changing the patch size Pat of the patch conductor 12 and the ring size RingWidth of the ring conductor 13, similarly to the first embodiment. Specifically, as the patch size Pat is larger, the central frequency is lower, and as the patch size Pat is smaller, the central frequency is higher. As the ring size RingWidth is larger, the bandwidth is narrower, and as the ring size RingWidth is smaller, the bandwidth is wider.

Figure 20A:
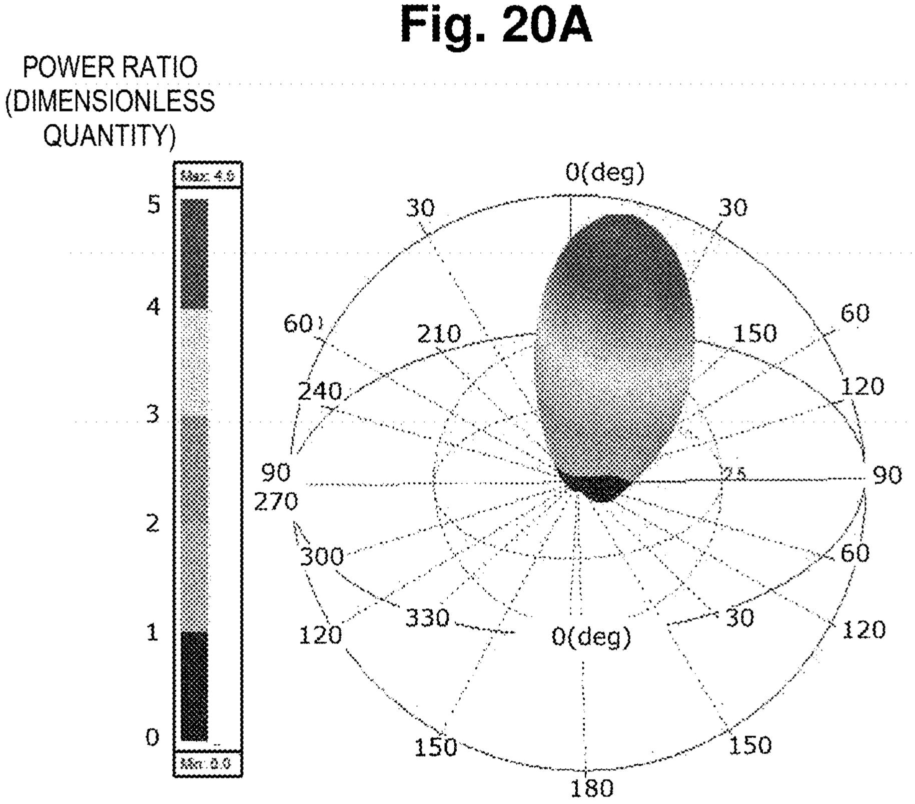
FIG. 20A is an explanatory diagram showing an analysis result (power ratio) of the (optimized) antenna integrated with a circuit according to the second embodiment.
Figure 20B:
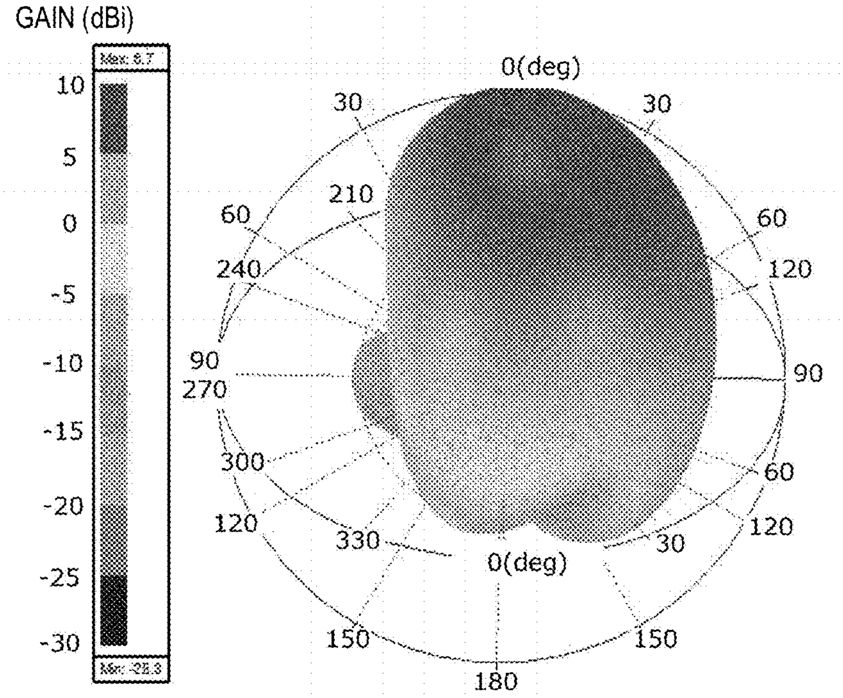
FIG. 20B is an explanatory diagram showing an analysis result (gain) of the (optimized) antenna integrated with a circuit according to the second embodiment.
Figure 21:
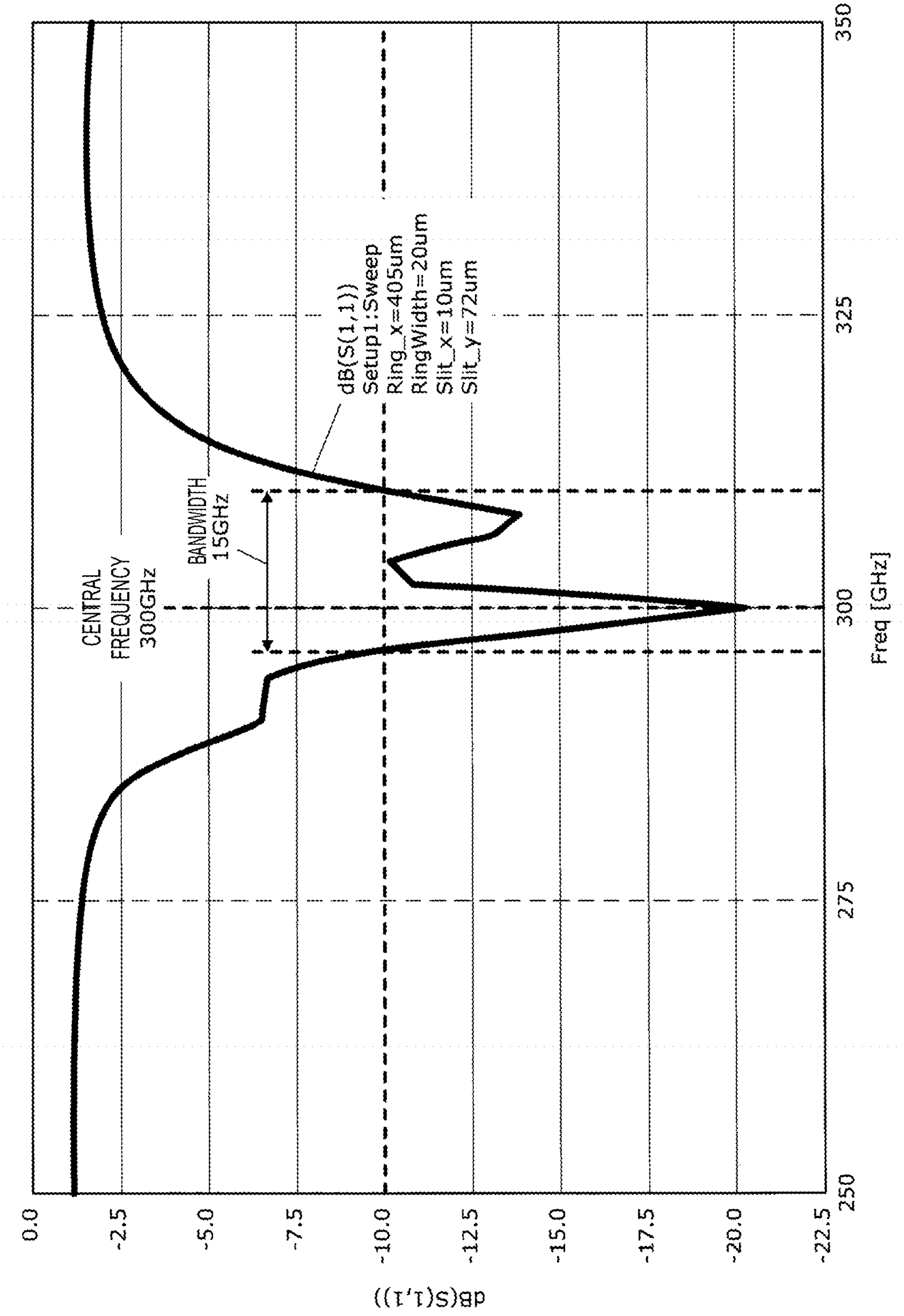
FIG. 21 is a graph showing frequency response of a reflection coefficient for the (optimized) antenna integrated with a circuit according to the second embodiment.

By changing the patch size Pat and the ring size RingWidth of the ring conductor 13, the central frequency and bandwidth can be optimized. FIG. 20A and FIG. 20B are explanatory diagrams showing analysis results of the (optimized) antenna integrated with a circuit according to the second embodiment. FIG. 21 is a graph showing frequency response of the reflection coefficient for the (optimized) antenna integrated with a circuit according to the second embodiment.

FIG. 20A, FIG. 20B, and FIG. 21 show a case in which, as an optimization example, the patch size Pat is changed from 250 μm to 270 μm to make the central frequency lower, and the ring size Ring is changed from 410 μm to 405 μm to make the bandwidth wider as compared to FIG. 14 and FIG. 15. Antenna parameters at a frequency of 305 GHz are as described below.

Directivity: 5.65 dBi
Gain: 4.97 dBi
Radiation efficiency: 75.5%
Overall efficiency: 69.6%

This optimization enables the central frequency and bandwidth to be maximized to a degree that resonance points are not excessively apart from each other to increase the radiation property in band. Accordingly, the bandwidth is 8 GHz in the property shown in FIG. 17, but is improved to 15 GHz through the optimization in FIG. 21, and it is understood that the bandwidth can be extended to approximately twice the radiation property of the common resonance system antenna. It is also understood from FIG. 20 that, even in the case in which the band is widened, the radiation property is maintained in a favorable state similarly to FIG. 16.

By changing the interval between the ring conductor 13 and the feed line 11, that is, the width of the gaps 16A and 16B, the central frequency of the radiation property can be adjusted. Note that, in the case of changing the width of the gaps 16A and 16B, the field strength concentrated on the vicinity of the gaps 16A and 16B is also changed, and therefore, the balance with the directivity needs to be considered.

Effects of the Second Embodiment

As described above, in the present embodiment, the ring conductor 13 is arranged to be electrically isolated from the feed line 11 and the patch conductor 12.

Accordingly, the field strength in the vicinity of the connection part 12B can be increased, and the field distribution concentrated on each of four, i.e., the upper, lower, left, and right, surfaces of the patch conductor 12 can be equalized to improve and stabilize the directivity further.

Extension of Embodiments

The present invention has been described above referring to the embodiments, but the present invention is not limited to the above embodiments. The configuration and details of the present invention can be subjected to various modifications that can be understood by those skilled in the art within the scope of the present invention. The respective embodiments can be implemented in combination arbitrarily within a consistent range.

REFERENCE SIGNS LIST

10 antenna integrated with circuit
11 feed line
12 patch conductor
12A one side
12B connection part
13 ring conductor
14 gap (first gap)
15A, 15B slit
16A, 16B gap (second gap)
B substrate
P front surface
R bottom surface
GND ground plane

The invention claimed is:

1. An antenna integrated with a circuit, the antenna comprising:

a feed line disposed directly on an upper surface of a dielectric substrate;

a patch conductor disposed directly on the upper surface of the dielectric substrate and configured to radiate an electromagnetic field fed from the feed line;

two slits disposed parallel to the feed line on both sides of a connection part between the patch conductor and the feed line and extending into an interior region of the patch conductor; and a ring conductor disposed directly on the upper surface of the dielectric substrate spaced apart from the patch conductor with an interposition of a first gap to surround an outer periphery of the patch conductor.

2. The antenna according to claim 1, wherein the ring conductor is connected to the feed line.

3. The antenna according to claim 1, wherein the ring conductor is spaced apart from the feed line with an interposition of a second gap.

4. The antenna according to claim 3, wherein the first gap and the second gap communicate with respective ends of the two slits.

5. The antenna according to claim 1, wherein the ring conductor comprises a strip having a constant width.

6. The antenna according to claim 1, wherein the first gap has an annular shape having a constant width.

7. The antenna according to claim 1, wherein the feed line is a microstrip line.

8. A method of forming an antenna integrated with a circuit, the method comprising:

forming a feed line directly on an upper surface of a dielectric substrate;

forming a patch conductor directly on the upper surface of the dielectric substrate, wherein the patch conductor radiates an electromagnetic field fed from the feed line;

forming two slits parallel to the feed line on both sides of a connection part between the patch conductor and the feed line and extending into an interior region of the patch conductor; and forming a ring conductor directly on the upper surface of the dielectric substrate spaced apart from the patch conductor with an interposition of a first gap to surround an outer periphery of the patch conductor.

9. The method according to claim 8, further comprising connecting the ring conductor to the feed line.

10. The method according to claim 8, wherein the ring conductor is spaced apart from the feed line with an interposition of a second gap.

11. The method according to claim 10, wherein the first gap and the second gap communicate with respective ends of the two slits.

12. The method according to claim 8, wherein the ring conductor comprises a strip having a constant width.

13. The method according to claim 8, wherein the first gap has an annular shape having a constant width.

14. An antenna integrated with a circuit, the antenna comprising:

a feed line disposed on an upper surface of a dielectric substrate;

a patch conductor disposed on the upper surface of the dielectric substrate at an interior end of the feed line and in direct contact with the interior end of the feed line at a connection part, the patch conductor being configured to radiate an electromagnetic field fed from the feed line;

two slits disposed immediately adjacent and parallel to the feed line on both sides of the connection part between the patch conductor and the feed line, the two slits extending into an interior region of the patch conductor; and a ring conductor disposed on the upper surface of the dielectric substrate surrounding an outer periphery of the patch conductor, the ring conductor being spaced apart from the outer periphery of the patch conductor by a first gap.

15. The antenna according to claim 14, wherein facing ends of the ring conductor are in direct contact with the feed line.

16. The antenna according to claim 14, wherein facing ends of the ring conductor are each spaced apart from the feed line by a second gap.

17. The antenna according to claim 16, wherein the first gap and the second gap communicate with respective ends of the two slits.

18. The antenna according to claim 14, wherein the ring conductor comprises a thin film conductor in a strip having a constant width.

19. The antenna according to claim 14, wherein an outer shape of the patch conductor and an inner shape of the ring conductor are a same shape.

20. The antenna according to claim 14, wherein:

the feed line, the patch conductor, and the ring conductor cover a first area of the upper surface of the dielectric substrate; and a ground plane is disposed on a bottom surface of the dielectric substrate and covers a second area corresponding to the first area.

* * * * *